(12) United States Patent
Turanjanin

(10) Patent No.: US 10,898,937 B2
(45) Date of Patent: Jan. 26, 2021

(54) APPLICATION OF THE 3D CAMERAS TO THE PROFILE BENDING PROCESS ON THE BENDING MACHINE WITH THREE AND FOUR ROLLERS

(71) Applicant: Uros Turanjanin, Kragujevac (RS)

(72) Inventor: Uros Turanjanin, Kragujevac (RS)

(*) Notice: Subject to any disclaimer, the term of this patent is extended or adjusted under 35 U.S.C. 154(b) by 398 days.

(21) Appl. No.: 15/535,376

(22) PCT Filed: Feb. 24, 2015

(86) PCT No.: PCT/IB2015/051368
§ 371 (c)(1),
(2) Date: Jun. 13, 2017

(87) PCT Pub. No.: WO2016/092381
PCT Pub. Date: Jun. 16, 2016

(65) Prior Publication Data
US 2017/0333968 A1 Nov. 23, 2017

(30) Foreign Application Priority Data
Dec. 12, 2014 (RS) .................................. 2014/0682

(51) Int. Cl.
*B21D 7/14* (2006.01)
*B29C 53/08* (2006.01)
(Continued)

(52) U.S. Cl.
CPC .................. *B21D 7/14* (2013.01); *B21D 7/08* (2013.01); *B21D 7/085* (2013.01); *B29C 53/083* (2013.01); *B29C 53/8041* (2013.01); *G01B 11/02* (2013.01)

(58) Field of Classification Search
CPC ... B21D 7/08; B21D 7/12; B21D 7/14; B21D 9/10; G01B 11/002; G01B 11/005;
(Continued)

(56) References Cited

U.S. PATENT DOCUMENTS 5,305,223 A * 4/1994 Saegusa .................. B21D 7/12
700/165
5,479,683 A * 1/1996 Flemmer .................. B21F 1/00
140/88
(Continued)

OTHER PUBLICATIONS

International Search Report and Written Opinion for Application No. PCT/IB2015/051368 dated Aug. 7, 2015 (9 pages).
(Continued)

*Primary Examiner* — Shelley M Self
*Assistant Examiner* — Katie L. Parr
(74) *Attorney, Agent, or Firm* — Michael Best & Friedrich LLP

(57) ABSTRACT

A bending machine has an automated profile bending process for providing controlled management, regulation of the controlled management, correction of the automated profile bending process, and application of 3D cameras to the bending machine. The bending machine includes a first camera fixed to a first holder and a second camera fixed to a second holder. The bending machine further includes rollers for applying the holders to the bending machine to provide a three-dimensional view of a portion of the bending process. The bending machine even further includes a computer for controlling the bending process, and the bending process includes a profile defined dimensionally and in space relative to the bending machine.

17 Claims, 9 Drawing Sheets

Figure 1:
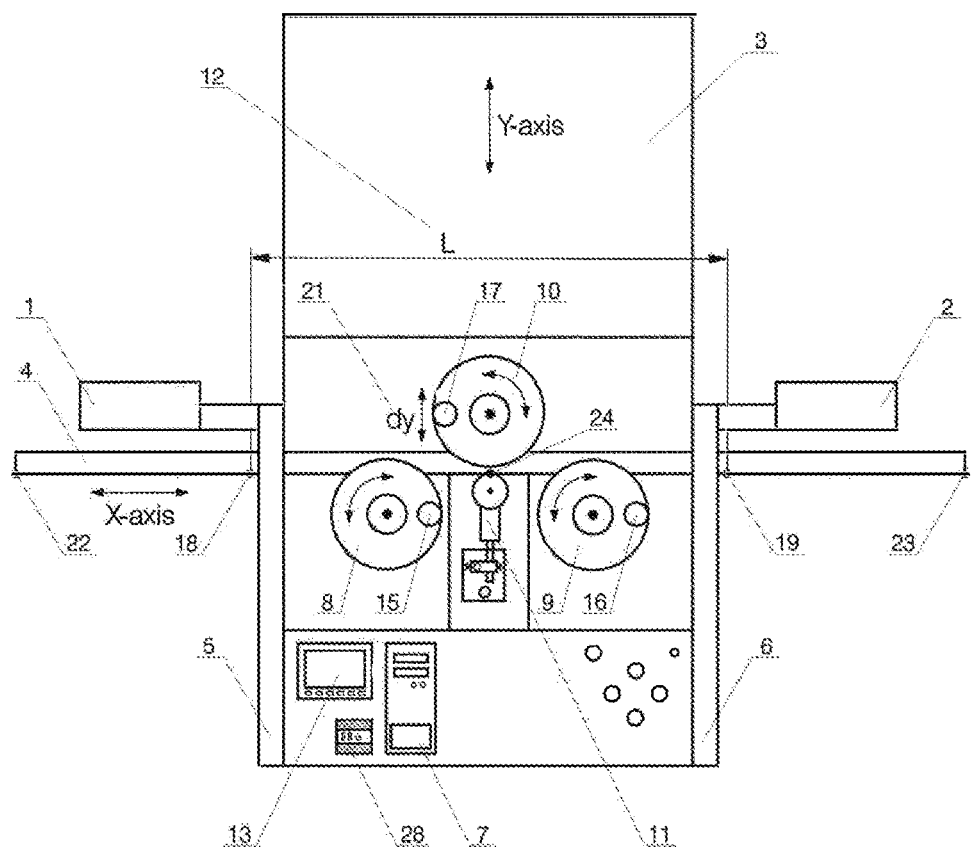

(51) Int. Cl.
  *B21D 7/08* (2006.01)
  *B29C 53/80* (2006.01)
  *G01B 11/02* (2006.01)
(58) Field of Classification Search
  CPC ............... G05B 19/401; G05B 19/408; G05B 19/4086; B23Q 17/2404–2423; B23Q 17/2471
  USPC ............ 72/11.1, 11.2, 11.5, 11.6, 11.7, 11.8, 72/12.5, 12.7, 12.8, 31.04, 226–235, 3, 72/1.05, 31.05, 31.1, 37
  See application file for complete search history.

(56) References Cited

U.S. PATENT DOCUMENTS

| | | | | |
|---|---|---|---|---|
| 5,992,210 | A * | 11/1999 | Blurton-Jones | B21D 7/14 72/149 |
| 6,041,140 | A * | 3/2000 | Binns | G06T 7/593 382/209 |
| 6,807,835 | B1 * | 10/2004 | Sekita | B21D 5/02 700/165 |
| 8,646,300 | B2 * | 2/2014 | Caporusso | B21D 5/14 72/17.3 |
| 2005/0262911 | A1 * | 12/2005 | Dankowicz | B21D 7/14 72/31.04 |
| 2009/0178453 | A1 * | 7/2009 | Ghiran | B21D 7/024 72/31.05 |
| 2010/0118123 | A1 | 5/2010 | Freedman et al. | |
| 2010/0281937 | A1 | 11/2010 | Caporusso et al. | |
| 2013/0147093 | A1 * | 6/2013 | Turanjanin | B29C 53/083 264/479 |
| 2013/0250094 | A1 * | 9/2013 | Rueb | G01C 11/00 348/94 |
| 2013/0319061 | A1 * | 12/2013 | Tofini | B21D 7/14 72/11.1 |
| 2015/0320471 | A1 * | 11/2015 | Crawford | B21D 7/12 72/11.1 |

OTHER PUBLICATIONS

International Preliminary Report on Patentability for Application No. PCT/IB2015/051368 dated Jun. 22, 2017 (7 pages).
Tim-Machine, "Bending PVC Profiles," <https://www.youtube.com/watch?v=Qx1ZK9ggsnw> dated Dec. 13, 2012.

* cited by examiner

APPLICATION OF THE 3D CAMERAS TO THE PROFILE BENDING PROCESS ON THE BENDING MACHINE WITH THREE AND FOUR ROLLERS

CROSS-REFERENCE TO RELATED APPLICATIONS

This application is a National Phase Application under 35 USC 371 of PCT/IB2015/051368, filed Feb. 24, 2015 (published as WO 2016/092381) and claiming priority to Serbian patent application no. P-20140682, filed on Dec. 12, 2014. The disclosure of the prior applications are considered part of and is incorporated by reference in their entirety in the disclosure of this application.

TECHNICAL FIELD

The invention in question, in a broader sense, is a part of the profile bending field and, in a more narrow sense, is a part of the automated profile bending process, where 3D cameras are applied to the profile bending machine with three and four rollers. The application of the 3D cameras enables the detection of the profile during the bending process, thus providing controlled management, regulation of control as well as correction of the bending process in real time. The application of the 3D cameras establishes a feedback loop between the computer which controls the bending process and the profile which is being bent on the machine, with the end goal to produce desired output, that is, profile bent to the predetermined angle, radius or diameter, at the end of the bending process.

According to the international patent classification the IPC marks of the patent are: B29 C 5308; G05B 19/19.

TECHNICAL PROBLEM

Technical problem, solved with the current invention, is how to detect the profile during the bending process on the bending machine with three and four rollers using the 3D cameras, thus achieving a feedback loop between the computer controlling the process and the profile bent on the machine. The 3D cameras provide a three-dimensional view of the bending process where each point of interest on the machine and on the profile is defined dimensionally and in space. The 3D cameras define the position of the profile in all three axes as well as the position of all points and objects of interest set in the area around machine. The application of the 3D cameras establishes a feedback loop which provides real time information to the computer regarding the profile being bent on the machine, that information being a current measured state which is being compared with the anticipated, that is, predetermined state. The application of the 3D cameras to the bending machine with three and four rollers provides controlled management, regulation of control as well as correction of the bending process, where, upon the initial 15° angle is bent, the initiated bending process is corrected if it is not being executed as anticipated, with the aim of achieving predetermined angle, radius or diameter of the bent profile when the controlled bending process is completed.

THE STATE OF THE ART

Bending machine for aluminum and pvc profiles, patent number RS 964U, does not utilize 3D cameras since it does not have microprocessor controlling system which is necessary in order to implement the 3D cameras. With this machine the profile bending process is done semi-automatically where the operator controls the bending process manually using buttons only. This type of machine control does not provide a feedback loop which can lead to a mistake by the operator when determining the desired radius or diameter of the arch as well as a mistake when positioning the profile during the bending.

Bending procedure shown in the patent WO 2009/101649 A2, where the method for checking and control a roller bending machine for continuously bending an elongated work piece at variable curvature radii and machine so controlled are presented, uses an encoder for measuring the movement of the profile on the machine. This method also employs a contactless device for measuring the distance in one point, used to send information to the computer regarding the distance between the sensor itself and the predefined spot on the elongated profile. The computer utilizes this information in order to calculate the radius of the bent part based on the measurements of the mentioned length in several passes and comparison of the calculated radius of the arch with the desired radius of the arch in the mentioned bent part. Unlike the invention in question where the feedback loop includes 3D cameras, within the abovementioned method the feedback loop includes a contactless device for measuring the length in one point. The contactless device for measuring the length in one point, used in the abovementioned method, differs from the invention in question since it does not have same options nor can provide same feedback to the computer as can be provided using the 3D cameras. First and foremost, the contactless device for measuring the length in one point measures the distance between the sensors and fixed predefined point on the profile, whereas the 3D cameras provide a three-dimensional view of the bending process to the computer in real time. Based on this information, the initiated process is being corrected if the bending is not being executed according the predefined plan with the aim of achieving previously determined angle, radius or diameter of the bent profile when the bending process is completed. Unlike the devices used in the above-mentioned method, the 3D cameras applied to the machine with three rollers are able to define the position of the profile in all three axes as well as the position of all the points, that is, objects of interest in the area around the machine. What the 3D cameras connected with the computer can provide, in contrast to the devices in the abovementioned method, is the detection of outer and inner lines of the profile, determination of the current angle formed between the left and right side of the arch as well as detection of the position of the middle point of the arch. Unlike the devices in the abovementioned method, the 3D cameras connected with the computer can determine the beginning and the end of the bending process so that the straight parts of the arch are parallel at the end of the bending process, if that was requested. Furthermore the 3D cameras can determine if the arch is bent to the predetermined angle, radius or diameter, which is the aim of the invention in question. It should be emphasized that the contactless device for measuring the length in one point can provide only the measurement of the distance between the sensor and the point on the profile and with this it is not possible to calculate the current angle formed between the left and right side of arch during the bending process and therefore it is not possible to predict the angle, that is, the parallel position of the straight parts of the arch.

The improvement of the mentioned patent is shown in the patent document EP 2 248 6 11 A I describing a bending machine for continuously bending an elongated work piece at predetermined radii using a 2D laser sensor. The 2D laser sensor can be described as an advanced version of the contactless device for measuring the length in one point, with the distinction that the 2D laser sensor performs measurement in several different points (usually 8 points) between the profile and the mentioned device. Similar to the patent document WO 2009/101649 A2, the 2D laser sensor is applied to this machine in order to detect the distance between the points on the profile and the sensor, and that information is being processed by the computer and converted into the radius of the arch, this being the aim of the mentioned machine. Purpose of the length meter or encoder, as mentioned, is to measure the length of the elongated profile, that is, the position of the profile during the bending. Unlike the devices used on the abovementioned machine, application of the 3D cameras in the invention in question provides a three-dimensional view of the bending process to the computer, where each point of interest on the profile and on the machine is defined dimensionally and in space. The 3D cameras applied to the bending machine with three rollers, contrary to the devices used on the abovementioned machine, are able to define the position of the profile in all three axes as well as the position of all the points and objects of interest in the area around the machine. For this purpose the 3D cameras with high lateral resolution are used, providing over 300000 measured points.

Measuring the points of interest around the machine the distance between the 3D cameras and the profile being bent on the machine is dimensionally defined. The possibility to measure the points of interest in the area around the machine provides the information required by the computer in order to determine the position of the profile during the bending and current angle formed between the left and right side of the arch. Unlike the patent WO 2009/101649 A2 and EP 2 248 6 11 AI, the 3D cameras can provide the detection of the outer and inner lines of the profile, determine the current angle formed between left and right side of the arch, detect the middle point of the arch and predict the parallel position of the straight parts of the arch if that is required.

Unlike the devices used on the aforementioned machines, the feedback loop formed between the 3D cameras and the computer can determine the beginning and the end of the bending process in such way to keep the straight parts of the arch parallel, if that is requested, while achieving predetermined angle, radius or diameter, this being the aim of the invention in question.

The application of the laser device for detecting the middle point of the arch to the bending machine, presented in the patent document RS 53431, introduces the manner of application of the laser device to the bending machine with three rollers. The application of the laser device during the profile bending process only provides the detection of the middle point of the arch, that is, the marked spot on the middle point of the arch part. The laser device used in the patent document RS 53431 and the 3D cameras used on the bending machine with three or four rollers have no similarities in the way they operate or in the measured values therefore the possibilities of each device are different. The invention in question provides a feedback loop for the afore mentioned information used by the computer in order to manage, control and correct the bending process in real time, whereas the laser device is used exclusively for detection of the middle point of the arch, that is, the marked spot on the middle of the arch part during the bending process.

SHORT DESCRIPTION OF THE INVENTION

The essence of the invention in question is the application of the 3D cameras to the profile bending machine with three and four rollers for detection of the profile during the bending process, thus implementing the feedback loop formed between the computer, a system which controls the bending process, and the profile, an output being bent on the machine. Based on the information received through the feedback loop the computer is able to manage the process, to control it and correct it if the bending procedure is not being executed according to the predetermined plan. The profile detected utilizing the 3D cameras represents the measured state which is being compared by the computer with the anticipated, predetermined state and based on this comparison the computer adjusts initiated bending process. Information gained via the 3D cameras are forwarded to the computer, thus providing controlled management, regulation of control as well as correction of the bending process in real time. The application of the 3D cameras provides a three-dimensional view of the bending process where each point of interest on the machine is defined dimensionally and in space.

With the 3D cameras it is possible to define the position of the profile in all three axes as well as to define the position of all points and objects of interest in the area around the machine. The application of the 3D cameras in a feedback loop with the computer provides the prediction of the bending process in order to get the straight parts of the arch parallel, if that is required, and bent to the predetermined angle, radius or diameter when the bending process is completed, this being the aim of the invention in question. The innovation of the invention in comparison to the existing state of the art is the application of the 3D cameras to the bending machine with three and four rollers, where the detection of the profile in all three axes establishes the feedback loop used by the computer for controlling the bending process in real time in order to get the desired output at the end of the bending process, that is, the profile bent to the predetermined angle, radius or diameter. The existing machines, processes and methods neither utilize nor apply the 3D cameras during the profile bending process.

SHORT DESCRIPTION OF THE DRAWINGS

The invention in question is presented in details in the following figures:

FIG. 1—Shows the top view of the bending machine with three rollers prior to the beginning of the profile bending process.

Figure 2:
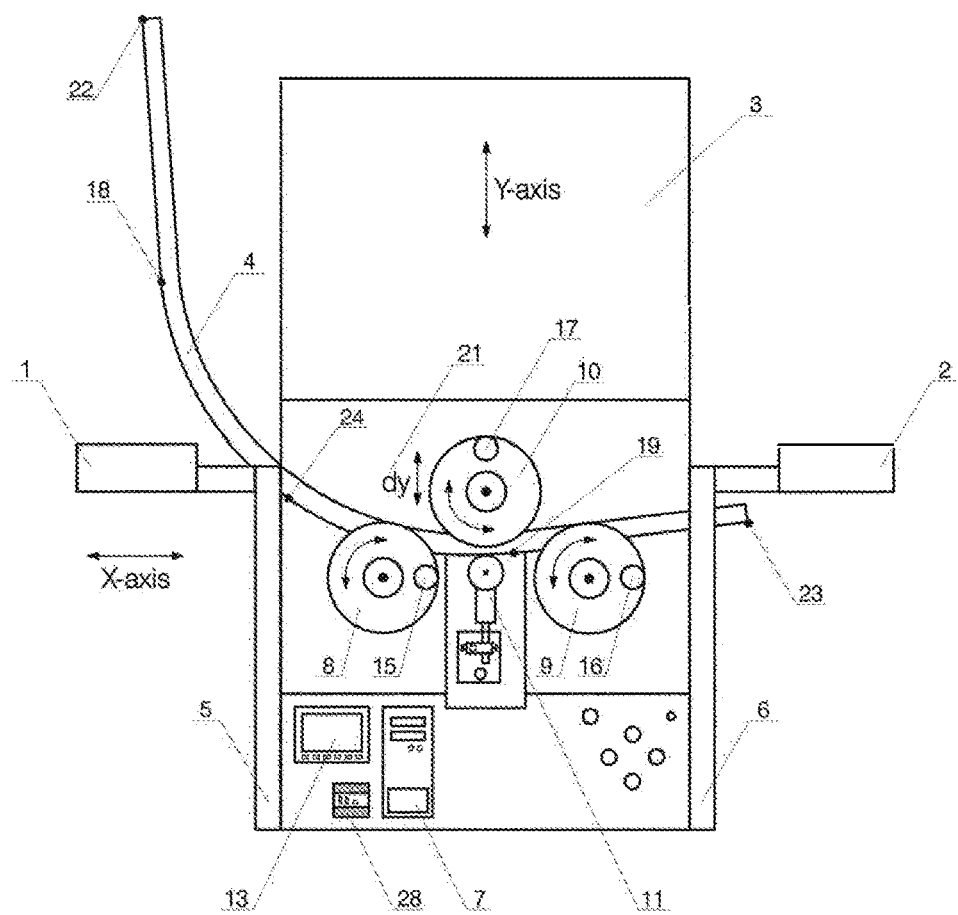

FIG. 2—Shows the top view of the bending machine with three rollers during the profile bending process.

Figure 3:
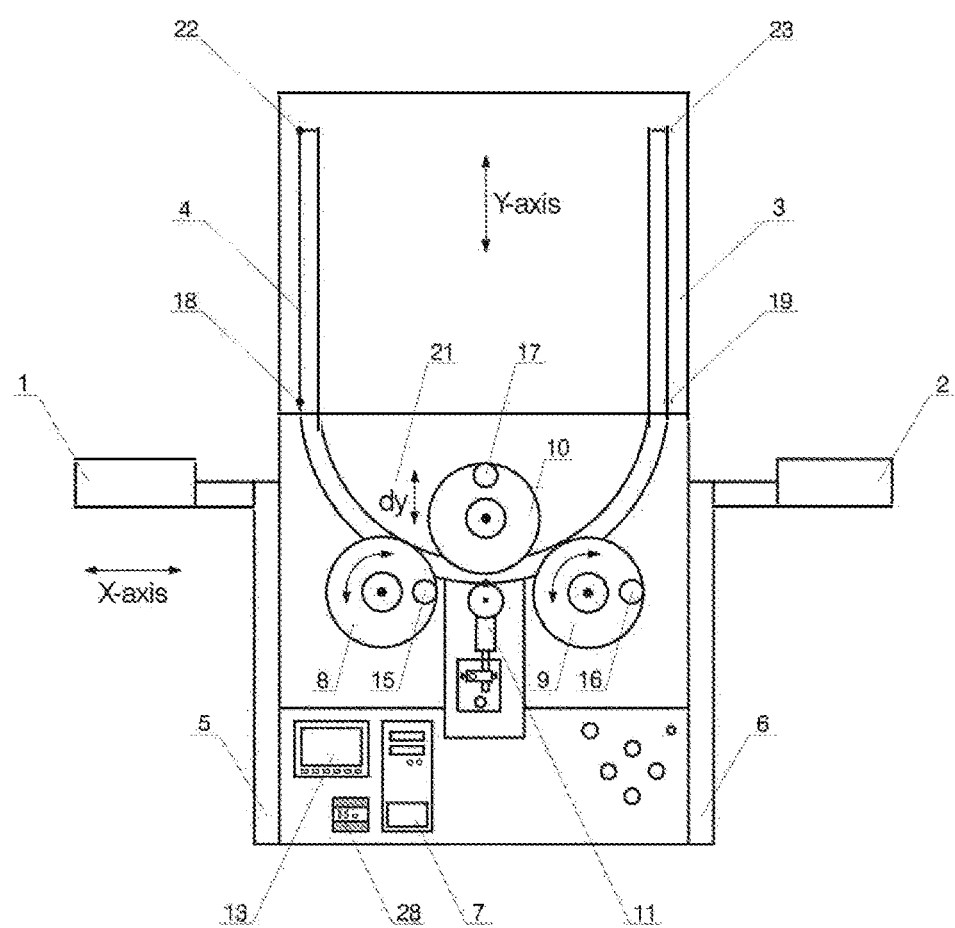

FIG. 3—Shows the top view of the bending machine with three rollers at the end of the profile bending process.

Figure 4:
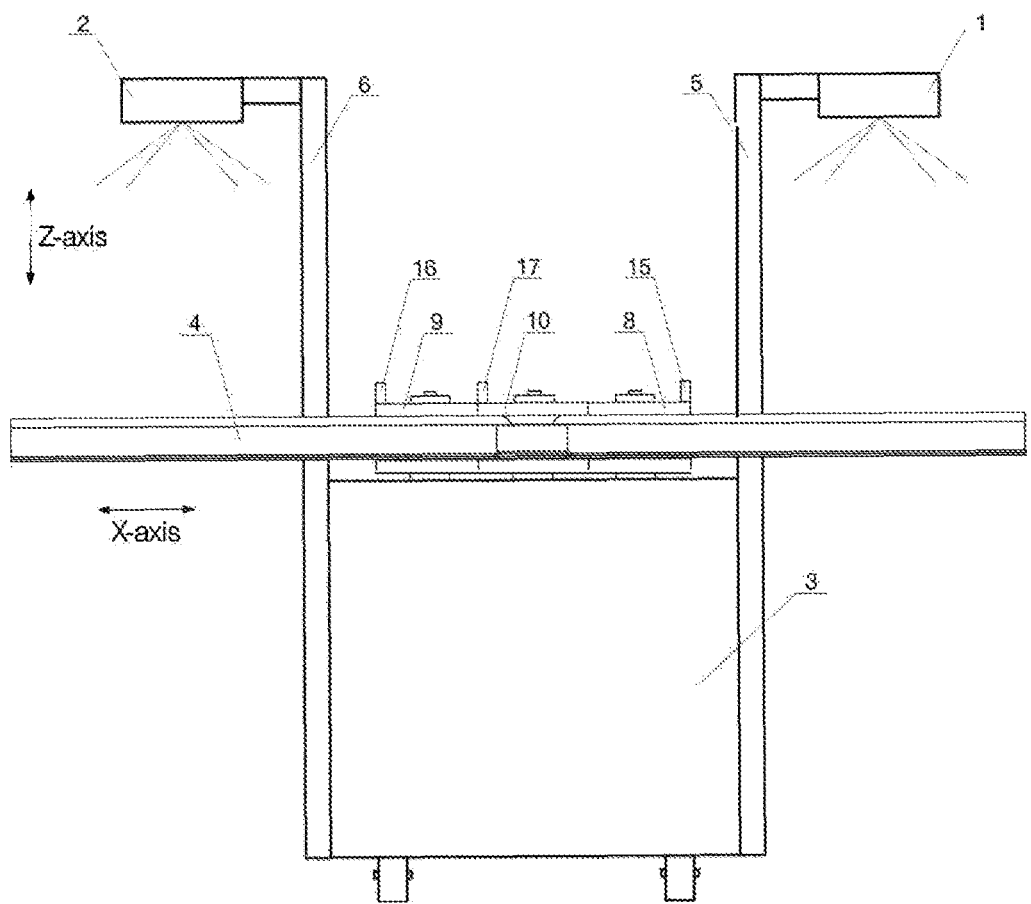

FIG. 4—Shows the frontal view of the bending machine with three rollers.

Figure 5:
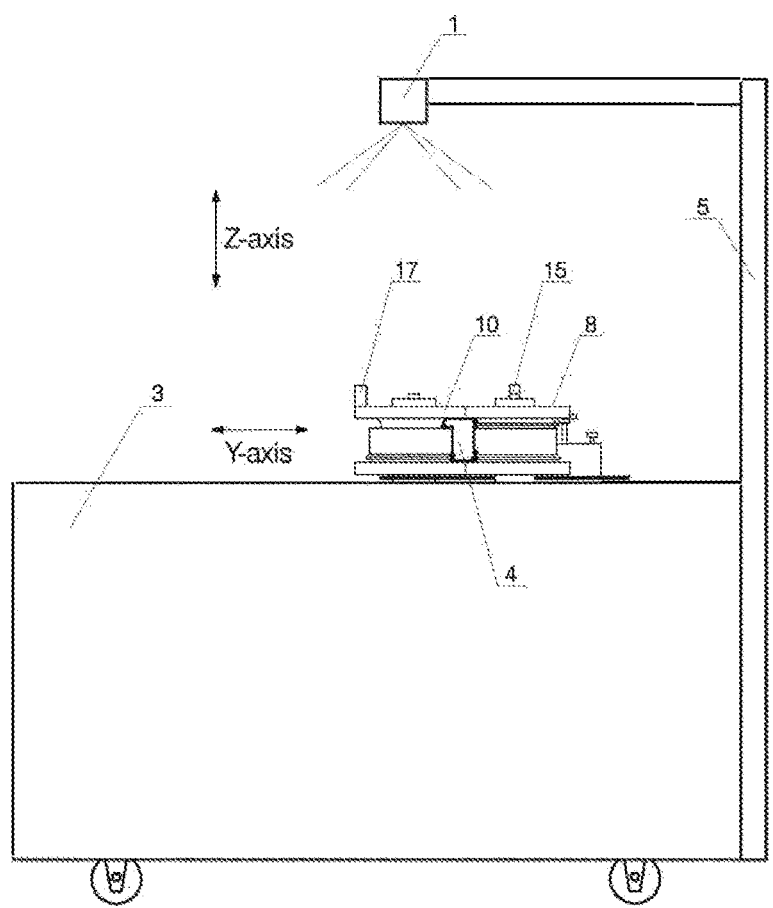

FIG. 5—Shows the side view of the bending machine with three rollers.

Figure 6:
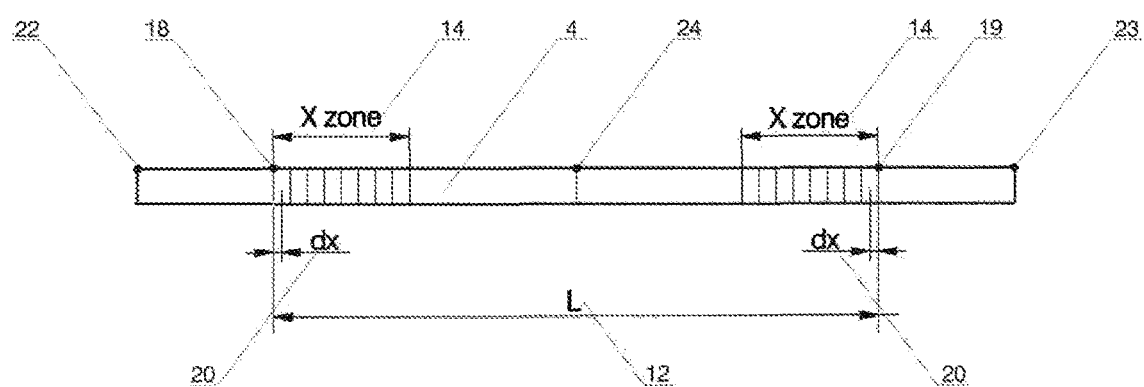

FIG. 6—Shows markings and points of interest on the profile.

Figure 7:
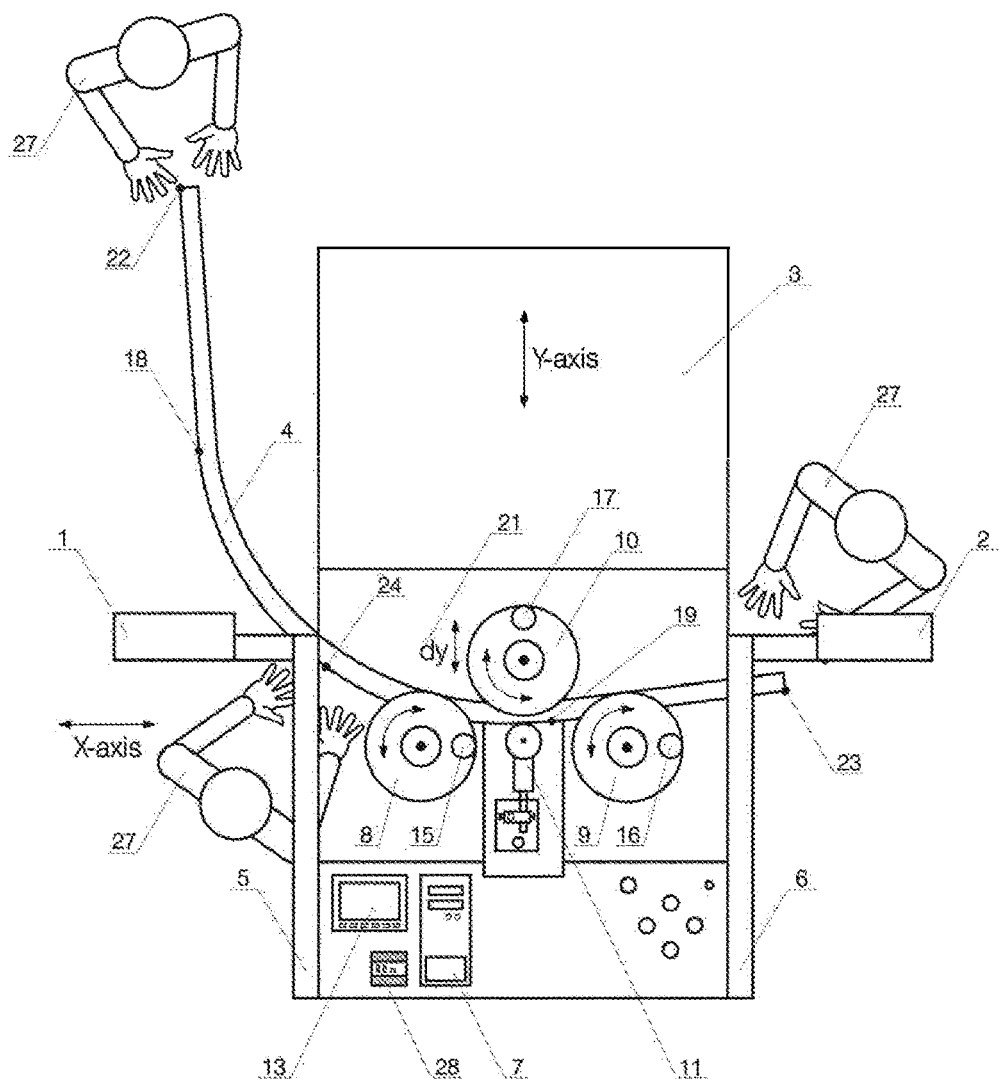

FIG. 7—Shows the top view of the bending machine with three rollers with detected obstacles inside the bending zone.

Figure 8:
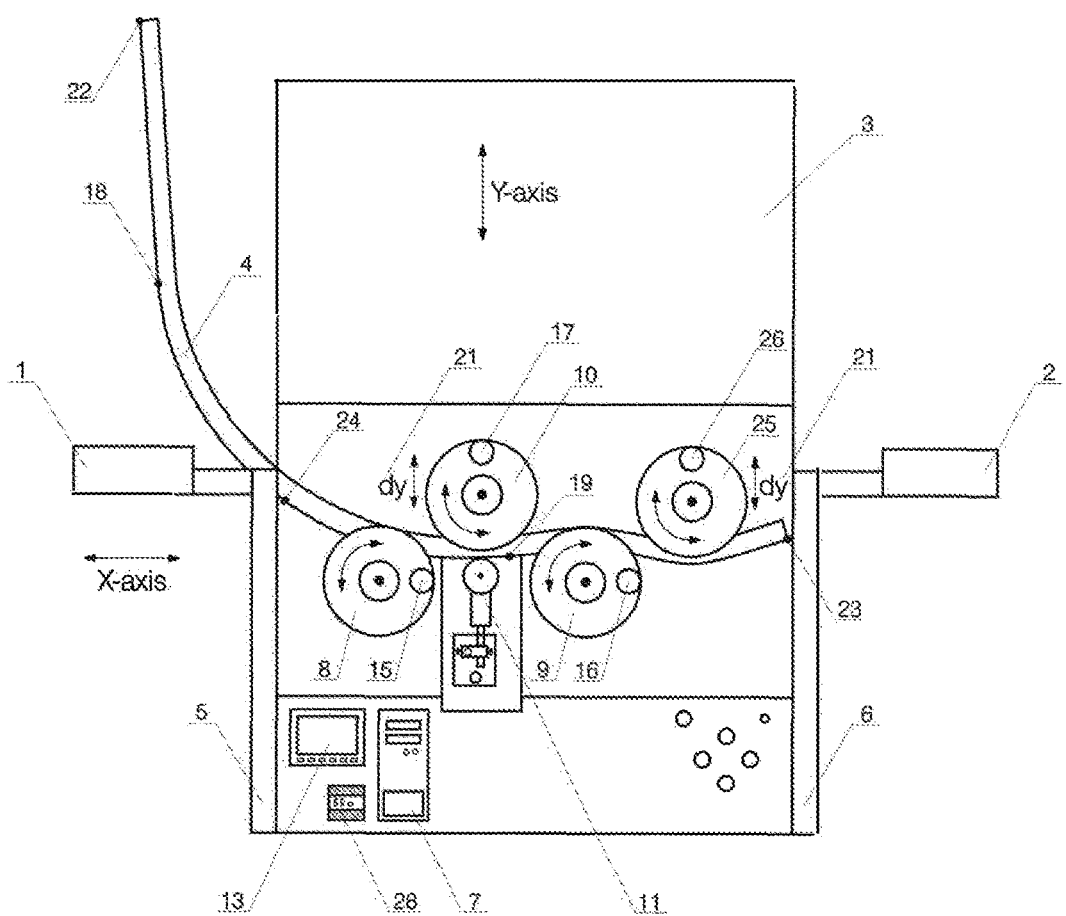

FIG. 8—Shows the top view of the bending machine with four rollers during the profile bending process.

Figure 9:
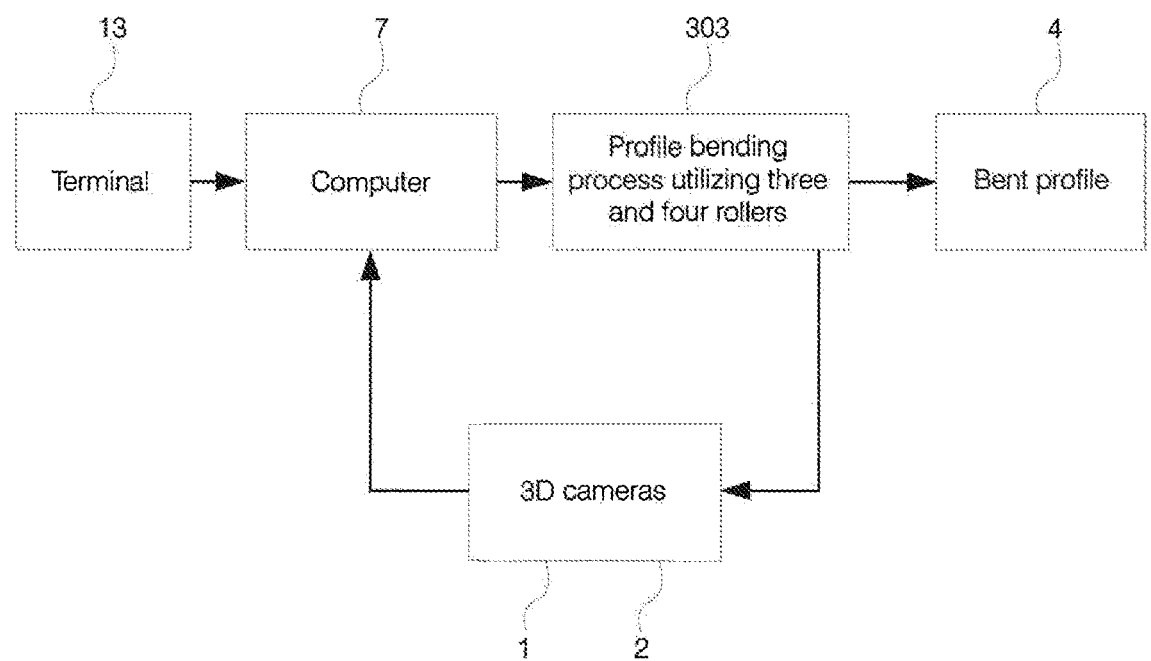

FIG. 9—Shows the block diagram of the feedback loop between the computer, 3D cameras and profile bending process.

DETAILED DESCRIPTION OF THE INVENTION 3D cameras (1) and (2) represent sensors which provide a three-dimensional view of the area around a machine (3)

covered by their field of view. Unlike regular 2D cameras which assign colour to each pixel, or thermal cameras which assign temperature to each pixel, the 3D cameras (1) and (2) assign to each pixel a distance between the camera and the object seen by that pixel. In other words, 3D cameras (1) and (2) can be utilized for reliable detection of the size and shape of the objects in their field of view as well as for the detection of the distance of the objects from the camera.

The 3D cameras (1) and (2) have lateral resolution, that is, the number of pixels in the matrix (similar to the regular cameras), as well as depth resolution, that is, the ability of the camera to determine the distance between the camera and the object for each pixel in the matrix. Up to now, several technologies using 3D cameras have been published, the most reliable being the Time-Of-Flight method, used for detecting the distance between the camera and the object by sending the modulated optical signal and measuring the time needed for the signal to reflect off the object and return back to the sensor.

The second method utilizes triangulation, that is, a geometrical method which includes the usage of a collimated light source shifted aside from the 2D camera. The 2D camera detects the position of the optical signal in space and determines the distance of the object from the camera based on the detected position.

The third method includes illumination of the scene using spatially encoded optical scheme which is being detected by a regular 2D camera, detecting the "deviation" of the encoded optical scheme and based on this detection the distance between the object and the camera is indirectly calculated.

The fourth method of realization of 3D cameras implies the utilization of two regular 2D cameras shifted in space, where complicated computer algorithms are able to determine the distance of the objects in the field of view of the cameras based on the displacement of the pixels between the left and the right camera and the shadow (this method is usually referred to as the stereo vision).

All of the abovementioned methods can be utilized for realization of the 3D cameras (1) and (2) on the profile bending machine (3) with three and four rollers (8), (9), (10) and (25), wherein the detailed description of the methods surpasses the framework of the patent. The 3D cameras (1) and (2), realized according to one of the abovementioned architectures, are set on holders (5) and (6) firmly fixed to the bending machine (3) with the three or four rollers (8), (9), (10) and (25). The distance of the 3D cameras (1) and (2) from a profile (referred to hereafter as a workpiece) (4) depends on the field of view and the desired length of the workpiece (4) that has to be detected. Typically, for cameras with 60° horizontal field of view and 40° vertical field of view the 3D cameras (1) and (2) are set vertically to the machine (3), 1.8 up to 2 m above the machine (3) and from there they monitor the workpiece (4) bending process, thus implementing the regulation of the control, that is the possibility to correct the bending process based on a feedback loop formed between the computer (7) and the workpiece (4) bent on the machine (3).

The 3D cameras (1) and (2) can also be set horizontally or at a certain angle to the machine (3) with the aim of increasing the field of view, that is, enabling the detection of long workpieces, when compared to the detection provided using a vertical construction. With 3D cameras with wide field of view the usage of only one 3D camera is also possible which would decrease the complexity of the system. The computer (7) is connected to a PLC (Programmable Logic Controller) device (28) using an electronic connection and its purpose is to control the engines which propel the rollers (8), (9), (10) and (25). Maximum length of the workpiece (4) detected utilizing the 3D cameras (1) and (2) aligned in this manner is around 4 m, not excluding the possibility of adding additional 3D cameras if deemed necessary. The 3D cameras (1) and (2) can be set vertically and/or horizontally to the machine (3), depending on the position of the machine (3).

The control and correction of the bending process can also be achieved using only one or more 3D cameras where it is necessary to consider the field of view of the camera and the maximum length of the workpiece which has to be detected. The 3D cameras (1) and (2) set above the machine (3) utilize the principle of optical encoding explained in Patent Application Publication No. US20100118123A1 and, in addition, both TOF based cameras and cameras based on triangulation or stereo vision can be used with equal success. Therefore, the invention in question does not exclude the possibility of utilizing other types of 3D cameras which are not based on the principle of optical encoding.

With the application of the 3D cameras (1) and (2) to the machine (3) the regulation of control of the automated bending process is achieved, wherein the computer (7) receives a three-dimensional view of the complete area observed by the 3D cameras (1) and (2) and the computer (7) distinguishes the information regarding the area where the workpiece (4) is positioned. It is possible to distinguish this information utilizing the 3D cameras (1) and (2) assuming that the distance between the workpiece (4) and 3D cameras (1) and (2) is known. Further processing of this information calculates the bending of the workpiece (4) in real time.

The 3D cameras (1) and (2) provide a three-dimensional view to the computer (7) and using this data it is possible to receive and determine all necessary distances between the 3D cameras (1) and (2) and points of interest observed on the machine (3) and the workpiece (4). With the 3D cameras (1) and (2) it is possible to measure the position of the observed objects, that is, points in all three axes, thus defining the distance of each point of interest around the machine (3) dimensionally and in space.

The application of the 3D cameras (1) and (2) enables a feedback loop for a significant amount of information needed by the computer (7) in order to control and, later on, correct the bending process, if the bending procedure of the workpiece (4) is not performed according to the predetermined plan. By measuring the points of interest in the area around the machine (3), the 3D cameras (1) and (2) detect the workpiece (4) during the bending process as a current measured state which is compared by the computer (7) with the desired state. Afterwards, the computer (7) determines needed correction using conventional laws of control (such as proportional-integral-derivative—PID regulation). The computer (7) corrects the bending process (303) in order to achieve predetermined output at the end of the bending process, that is, the workpiece (4) bent to the predetermined angle, radius or diameter. The predetermined parameters, angle, radius or diameter are input via terminal (13).

One of the aims of the application of the 3D cameras (1) and (2) is the possibility of the computer (7) to predict the parallel position of the straight parts of the arch, simultaneously achieving predetermined angle, radius or diameter at the end of the bending process. The parallel position of the straight parts is achieved by the computer (7) correcting the initiated bending process upon bending initial 15°, using an implemented law of control, setting the value of dx (20) to the value necessary in order to get one half of the total predetermined angle required at the end of the bending process on the middle of the X zone (14). The same method of adjusting the value of the dx (20) is used to achieve the parallel position of the straight parts of the arch, adjusting the radius at the middle point of the X zone (14) to the half value of the total predetermined radius, required at the end of the bending process.

Utilizing the 3D cameras (1) and (2), which represent the feedback loop within the bending process, the computer (7) determines the current position of the workpiece (4) along the X axis during the bending process, based on the distance shift between the workpiece (4) and the rollers (8), (9), (10) and (25) and fixed points on the machine (3). Utilizing the 3D cameras (1) and (2) the computer (7) calculates the angle formed between the straight parts on the left and right side of the arch, based on the detection of the position of the points (18) and (19) which are the staring bending points of the workpiece (4). Utilizing the 3D cameras (1) and (2) the computer (7) determines what kind of material is bent on the machine (3), based on the comparison of the angle achieved between the straight parts of the arch upon bending initial 15° and the predetermined angle of the arch. Using this information the computer (7) determines the corrective parameter of elasticity defined by the type of the material being bent on the machine (3).

Utilizing the 3D cameras (1) and (2) the computer (7) calculates the elongation of the workpiece (4) during the bending process, based on the difference between the calculated length of the arch part (12) and current measured length of the arch part (12) defined by the points (18) and (19) on the workpiece (4). Utilizing the 3D cameras (1) and (2) the computer (7) determines the position of the rollers (8), (9), (10) and (25) rotating on the machine (3) based on the detection of the rotation and straightforward movement of the auxiliary rollers (15), (16), (17) and (26) set on the top edges of the rollers (8), (9), (10) and (25). Utilizing the 3D cameras (1) and (2) the computer (7) determines the point (24) which represents the middle point of the workpiece (4), based on the detection of the points (22) and (23) set on each end of the workpiece (4).

Utilizing the 3D cameras (1) and (2) the workpiece (4) is being automatically positioned to the point (24), defined as the middle point of the workpiece (4) by the computer (7), at the beginning of the process. Utilizing the 3D cameras (1) and (2) the computer (7) defines the point (24), also representing the middle point of the arch, based on detecting the position of the points (18) and (19) set on both ends of the arch part (12) being the starting points of the bending process for the workpiece (4). The application of the 3D cameras (1) and (2) for detecting the workpiece (4) enables the computer (7) to calculate the radius of the arch during the bending process, based on the angle and the position of the points (18) and (19) set on the ends of the arch part (12). Utilizing the 3D cameras (1) and (2) the computer (7) calculates the amount of slipping of the workpiece (4) compared to the encoder (11), based on the difference between the distance travelled by the workpiece (4) measured by the 3D cameras (1) and (2) and the distance travelled by the workpiece (4) measured by the encoder (11). By comparing these two values it is possible to calculate if and for what amount did the workpiece (4) slip compared to the encoder (11).

The application of the 3D cameras (1) and (2) enables the computer (7) to determine the amount of slipping of the workpiece (4) during the bending process compared to the rollers (8), (9), (10) and (25), based on the difference of the distance travelled by the workpiece (4) measured with the 3D cameras (1) and (2) and the distance travelled by the auxiliary rollers (15), (16), (17) and (26) together with the rollers (8), (9), (10) and (25) during the bending process. In this manner, utilizing the feedback loop, the movement of the workpiece (4) through the machine (3) is determined and corrected if the workpiece (4) slipped during the process compared to the rollers (8), (9), (10) and (25).

Utilizing the 3D cameras (1) and (2) the computer (7) gains information regarding the obstacles (27) in the area around the rollers (8), (9), (10) and (25) thus providing security measures for the bending process and the operator managing the machine (3). In this manner the bending process can be temporarily stopped, every time when hand of the operator or object which is not an integral part of the machine (3) or the process is detected in the critical zone around the rollers (8), (9), (10) and (25), on the same height as the rollers. Here it is important to underline that only the utilization of the 3D cameras can provide unequivocal in formation if the detected obstacle (27) is on the height of interest, that is, if the detected person or object represents a safety issue for the operator and/or workpiece (4) bending process.

Utilizing the 3D cameras (1) and (2), the computer (7) receives information regarding the obstacles (27) around the workpiece (4) which are on the same height or higher than the workpiece (4). If the 3D cameras (1) and (2) detect the obstacle (27) or object within the critical distance from the workpiece (4), the machine (3) temporarily halts the bending process, presuming that the workpiece (4) can collide with the unknown object, leading to a detection error of the workpiece (4) length and position, thus potentially endangering the workpiece (4) bending process and creating a safety risk for the surrounding area.

Utilizing the 3D cameras (1) and (2) the computer (7) calculates the width and height of the arch or chord and height for the circular section or segment of the circle. Width and height of the arch are calculated by the computer (7) based on the information regarding the achieved angle of the arch, radius of the arch and position of the points (18) and (19).

Utilizing the 3D cameras (1) and (2) the computer (7) detects different radii within one arch, based on the information regarding the achieved angle of the arch and position of the points on the arch part (12) where one radius ends and another begins. Utilizing the 3D cameras (1) and (2) the computer (7) detects current length of the arch part (12) during the bending process, based on the detection of the points (18) and (19) on the workpiece (4). Points (18) and (19) represent starting bending points of the workpiece (4), that is, the point where straight part of the workpiece (4) ends and the arch part begins.

Utilizing the 3D cameras (1) and (2) the computer (7) determines the initial position of the workpiece (4) before the bending process starts, based on the detection of the angle alteration between the straight parts of the workpiece (4). The moment when the angle between the straight parts of the workpiece (4) alters represents a starting point of the workpiece (4) bending. As soon as the workpiece (4) is bent for 2°, the roller (10) is moved back for the same distance that caused the alteration of the angle, thus determining the zero, that is, the initial position of the workpiece (4).

Utilizing the 3D cameras (1) and (2) the computer (7) ends the bending process when the predetermined angle, radius or diameter of the arch is achieved, based on the comparison of the current detected angle, radius or diameter of the arch with the predetermined angle or radius of the arch performed by the computer (7). Utilizing the 3D cameras (1) and (2) the computer (7) determines the total length of the workpiece (4) before the bending process is initiated, based on the detection of the end points (22) and (23) on the workpiece (4).

Utilizing the 3D cameras (1) and (2) and with the assistance of the computer (7) the encoder (11), that is, the device for measuring the length of the workpiece (4), is calibrated if it is already being used on the machine for any reason. The calibration of the encoder (11) is performed by moving the workpiece (4) from one end to the other and comparing the movement of the workpiece (4) detected by the 3D cameras (1) and (2) with the movement of the workpiece (4) measured by the encoder (11) using the computer (7) and, based on this comparison, the computer (7) defines the relation, that is, the correctional parameter between these two devices.

The application of the 3D cameras (1) and (2) eliminates the need for the encoder (11) utilization which is used only for measuring the length of the workpiece (4) during the bending process. Immediately upon activating the machine (3), the 3D cameras (1) and (2) are calibrated in order for the computer (7) to determine their exact position, location and the angle between them, the machine (3) and the workpiece (4). When the calibration of the 3D cameras (1) and (2) is completed, the workpiece (4) is set between the rollers (8), (9), (10) and (25). The 3D cameras (1) and (2) form a feedback loop during the bending process where the computer (7) calculates the rotating speed of the rollers (8), (9), (10) and (25), based on the detection of the distance travelled by the auxiliary rollers (15), (16), (17) and (26) set on the edges of the rollers (8), (9), (10) and (25).

Utilizing 3D cameras (1) and (2) the computer (7) calculates the width of a workpiece being bent on the machine (3), based on detection of the distance between the points on the outer and inner edges of the workpiece (4). Utilizing the 3D cameras (1) and (2) the computer (7) defines the shape of a workpiece being bent on the machine (3), based on the three-dimensional view detecting the shape and outlines of the workpiece (4) on its ends. Based on the abovementioned data received utilizing the 3D cameras (1) and (2) the computer (7) is able to predict and correct initiated workpiece (4) bending process upon bending initial 15°, if the bending process is not developing according to the predetermined plan, with the aim of obtaining the workpiece (4) bent to the predetermined angle, radius or diameter as the end result of the bending process.

The 3D cameras (1) and (2) control the bending process according to the parameters input via terminal (13) prior to the bending process. When the parameters are given the automated bending process is initiated according to the defined iterative regime meaning that the workpiece (4) has to go through the bending rollers (8), (9), (10) and (25) for a predefined number of times, where the rollers (10) and (25) gradually move towards the workpiece (4) for a dy (21) step, thus, together with the remaining two rollers (10) and (25), leading to a gradual bending of the workpiece (4). If, upon bending initial 15°, the bending process is not developing according the predetermined plan the computer (7) corrects the bending process through conventional laws of control (such as proportional-integral-derivative—PID regulation) using the current value of the 15° angle between the left and the right side of the arch in order to correct the value of the dx (20), which represents the distance for which the movement of the workpiece (4) within the arch part (12) is shortened each time the workpiece (4) moves from left to right and vice versa.

The computer (7) calculates and corrects the dx (20) so that the absolute half of the predetermined, that is, expected angle of the arch is reached on the middle point of the X zone (14). In the same manner the correction of the dx (20) value can be calculated by the computer (7) based on the detection of the radius of the arch at the beginning of the bending process. X zone (14) is set symmetrically on both ends of the arch part (12). Inside X zone (14) the roller (10) executes the movement for the dy (21) value towards the workpiece (4), symmetrically on the left and right side of the workpiece (4). The length of the X zone (14) ranges from 150 up to 200 mm.

The length of the X zone (14) depends on the type of the material and width of the workpiece (4) bent on the machine (3). The application of the 3D cameras (1) and (2) on the bending machine (3) with three and four rollers (8), (9), (10) and (25) realizes the aim of the invention in question, the aim being the automated control of the process from the beginning to the end, with the workpiece (4) bent to the predetermined angle, radius or diameter.

The invention claimed is:

1. A bending machine having an automated workpiece bending process for providing controlled management, regulation of the controlled management, correction of the automated workpiece bending process, and application of 3D cameras to the bending machine, the bending machine comprising:
    a first 3D camera (1) and a second 3D camera (2), wherein the first and second 3D cameras are time-of-flight 3D cameras;
    a first holder (5) and a second holder (6);
    wherein the first 3D camera (1) is fixed to the first holder (5) and the second 3D camera (2) is fixed to the second holder (6), the first and second holders configured for applying the first and second 3D cameras (1, 2) to the bending machine (3) to provide a three-dimensional view of a portion of the bending machine;
    at least one fixed point on the bending machine (3);
    a workpiece (4) defined dimensionally and in space relative to the bending machine (3);
    rollers (8, 9, 10, 25); and
    a computer (7) configured for controlling the automated workpiece bending process;
    wherein the workpiece (4) is configured to be bent to a predetermined angle, radius or diameter;
    wherein the workpiece (4) and the at least one fixed point are configured to be detected during the bending process through use of the first and second 3D cameras (1, 2); and
    wherein the computer is configured to implement a feedback loop between the computer (7), the at least one fixed point, and the workpiece (4) bent on the bending machine (3) to achieve the predetermined angle, radius or diameter.

2. The bending machine according to claim 1, wherein in addition to the first and second 3D cameras (1, 2), one or more additional 3D cameras are configured to be used for a more reliable detection of the workpiece (4).

3. The bending machine according to claim 1, wherein the first and second 3D cameras (1, 2) are configured to be used horizontally, vertically or at a certain angle relative to the bending machine (3) to increase a field of view of the first and second 3D cameras (1, 2).

4. The bending machine according to claim 1, wherein the computer (7) is configured to detect the workpiece (4) during the bending process by utilizing the first and second 3D cameras (1, 2) configured for determining an exact position of the workpiece (4) with regard to the rollers (8, 9, 10, 25) and fixed points on the bending machine (3).

5. The bending machine according to claim 1, wherein the computer (7), utilizing the detection of the workpiece (4) by the first and second 3D cameras (1, 2), is configured to measure an angle, radius or diameter relative to the bending machine (3) formed by first side and second side straight parts of the workpiece based on a position of a first point (18) on the first side and a second point (19) on the second side, and wherein bending of the workpiece (4) occurs between the first point (18) and the second point (19).

6. The bending machine according to claim 1, wherein the feedback loop provided by the first and second 3D cameras (1, 2) is configured to determine a type of material bent on the bending machine (3), and wherein during an initial 15° of bending, a value of a measured angle, radius or diameter formed between straight parts of the workpiece (4) is configured to be compared with the predetermined angle, radius or diameter to provide information to the computer (7), and according to the information, the computer (7) is configured to evaluate the information and determine a corrective parameter of elasticity which defines the type of the material bent on the bending machine (3).

7. The bending machine according to claim 1,
wherein a bent portion (12) of the workpiece (4) is defined as a distance between a first point (18) on the workpiece (4) and a second point (19) on the workpiece (4),
wherein the first and second 3D cameras (1, 2) are configured to measure a length of the bent portion (12) during the bending process,
wherein concurrently the computer (7) is configured to calculate the length of the bent portion (12) based on distance information acquired from an encoder (11) during the bending process, and
wherein the computer (7) is configured to calculate elongation of the workpiece (4) as a difference between the calculated length of the bent portion (12) of the workpiece (4) and the measured length of the bent portion (12) of the workpiece (4).

8. The bending machine according to claim 1, wherein the feedback loop including the first and second 3D cameras (1, 2) is operable to measure a speed of the rollers (8, 9, 10, 25) rotating on the bending machine (3) based on distance traveled by auxiliary rollers (15, 16, 17, 26) set on top edges of the rollers (8, 9, 10, 25).

9. The bending machine according to claim 1, wherein the feedback loop including the first and second 3D cameras (1, 2) is operable to measure a position of a point (24), the point (24) representing a middle point of the workpiece (4) prior to bending of the workpiece (4) based on detection of points (22, 23) set on ends of the workpiece (4), wherein prior to bending of the workpiece (4), the middle point is in a middle region on the workpiece (4) between the points (22, 23).

10. The bending machine according to claim 1, wherein the feedback loop including the first and second 3D cameras (1, 2) is operable to measure a position of a point (24) by detecting points (18, 19) set on ends of a bent portion (12) of the workpiece (4) where bending of the workpiece (4) starts and determining the position of the point (24), and wherein the point (24) is in a middle part of the bent portion (12) of the workpiece (4).

11. The bending machine according to claim 1, wherein the feedback loop including the first and second 3D cameras (1, 2) is configured to measure a radius of a bent portion (12) of the workpiece (4) achieved during the bending process based on the predetermined angle, radius or diameter of the workpiece (4) and known position of points (18, 19) set on ends of the bent portion (12) of the workpiece (4).

12. The bending machine according to claim 1, wherein the feedback loop including the first and second 3D cameras (1, 2) is operable to measure an amount by which the workpiece (4) slipped during bending of the workpiece (4) relative to an encoder (11) by comparing a difference between a distance travelled by the workpiece (4) measured by the 3D cameras (1, 2) and a distance travelled by the workpiece (4) measured by the encoder (11).

13. The bending machine according to claim 1, wherein the feedback loop including the first and second 3D cameras (1, 2) is operable to measure an amount by which the workpiece (4) slipped during bending of the workpiece (4) relative to the rollers (8, 9, 10, 25) based on a difference between a distance travelled by the workpiece (4) measured by the 3D cameras (1, 2) and a distance travelled by auxiliary rollers (15, 16, 17, 26) moving together with the rollers (8, 9, 10, 25) during bending of the workpiece (4).

14. The bending machine according to claim 1, wherein the feedback loop including the first and second 3D cameras (1, 2) is operable to detect obstacles (27) in an area around the rollers (8, 9, 10, 25) on the bending machine (3) and temporarily halts the bending process when any of the obstacles (27) are detected inside the area.

15. The bending machine according to claim 1, wherein the feedback loop including the first and second 3D cameras (1, 2) is operable to detect obstacles (27) within an area of movement around the workpiece (4) which are at a similar height or higher than the workpiece (4) and temporarily halts the bending process if any of the obstacles (27) are detected in the area of movement at a similar height or higher than the workpiece (4).

16. The bending machine according to claim 1, wherein the feedback loop including the first and second 3D cameras (1, 2) is operable to measure a radius of a bent portion (12) of the workpiece (4) and positions of a first point (18) and a second point (19) on the workpiece (4), and wherein a height and width of the bent portion (12) of the workpiece (4) during the bending process are calculated by the computer (7) based on the radius and position of the points (18, 19) measured by the feedback loop.

17. The bending machine according to claim 1, wherein the feedback loop including the first and second 3D cameras (1, 2) is operable to detect a first radius and a second radius on a bent portion (12) of the workpiece (4), and wherein the computer (7) calculates a location on the workpiece (4) where the first radius ends and the second radius begins.

* * * * *